United States Patent
Palamarchuk et al.

(10) Patent No.: US 10,112,772 B1
(45) Date of Patent: Oct. 30, 2018

(54) INVENTORY HOLDER LOAD DETECTION AND/OR STABILIZATION

(71) Applicant: Amazon Technologies, Inc., Seattle, WA (US)

(72) Inventors: Andriy Palamarchuk, Winchester, MA (US); Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/847,863

(22) Filed: Dec. 19, 2017

Related U.S. Application Data

(63) Continuation of application No. 15/658,033, filed on Jul. 24, 2017, now Pat. No. 9,856,084, which is a continuation of application No. 15/276,602, filed on Sep. 26, 2016, now Pat. No. 9,738,449, which is a continuation of application No. 15/008,378, filed on Jan. 27, 2016, now Pat. No. 9,469,477, which is a continuation of application No. 14/491,752, filed on Sep. 19, 2014, now Pat. No. 9,280,153.

(51) Int. Cl.
  *G06F 7/00* (2006.01)
  *B65G 1/137* (2006.01)
  *G05D 1/02* (2006.01)

(52) U.S. Cl.
  CPC ............ *B65G 1/137* (2013.01); *G05D 1/021* (2013.01); *G05D 1/0214* (2013.01); *G05D 2201/0216* (2013.01)

(58) Field of Classification Search
  None
  See application file for complete search history.

(56) References Cited

U.S. PATENT DOCUMENTS

| | | | |
|---|---|---|---|
| 6,504,610 B1 * | 1/2003 | Bauer | G01B 11/272 356/399 |
| 8,280,547 B2 | 10/2012 | D'andrea et al. | |
| 9,280,153 B1 | 3/2016 | Palamarchuk et al. | |
| 9,469,477 B1 | 10/2016 | Palamarchuk et al. | |
| 9,738,449 B1 | 8/2017 | Palamarchuk et al. | |
| 9,856,084 B1 | 1/2018 | Palamarchuk et al. | |

(Continued)

OTHER PUBLICATIONS

U.S. Appl. No. 14/491,752, "Non-Final Office Action", dated Jul. 7, 2015, 9 pages.

(Continued)

*Primary Examiner* — Yolanda R Cumbess
(74) *Attorney, Agent, or Firm* — Kilpatrick Townsend & Stockton LLP

(57) ABSTRACT

An inventory system includes an inventory holder that may be moved by a mobile drive unit. The inventory holder may hold inventory items. The mobile drive unit may move in a manner for facilitating a shift of position of at least one inventory item relative to the inventory holder. Such movement may be accomplished, for example, by accelerating, decelerating, turning while driving, spinning, dropping the inventory holder, or by causing at least one of the mobile drive unit or the inventory holder to at least one of interact with or engage an obstacle such as a bump over which the mobile drive unit drives, a bar positioned above a floor on which the mobile drive unit drives, a wall, another mobile drive unit, or another inventory holder.

20 Claims, 8 Drawing Sheets

(56) References Cited

U.S. PATENT DOCUMENTS

| | | |
|---|---|---|
| 2010/0247275 A1 | 9/2010 | Karlen et al. |
| 2010/0263948 A1* | 10/2010 | Couture ................... B25J 5/005 180/8.2 |
| 2012/0143427 A1 | 6/2012 | Hoffman et al. |
| 2014/0214234 A1 | 7/2014 | Worsley et al. |
| 2016/0167557 A1* | 6/2016 | Mecklinger ............. B66F 9/063 414/495 |

OTHER PUBLICATIONS

U.S. Appl. No. 14/491,752 , "Notice of Allowance", dated Nov. 24, 2015, 6 pages.

U.S. Appl. No. 15/008,378 , "Notice of Allowance", dated Jul. 5, 2016, 9 pages.

U.S. Appl. No. 15/276,602 , "Non-Final Office Action", dated Dec. 30, 2016, 7 pages.

U.S. Appl. No. 15/276,602 , "Notice of Allowance", dated May 2, 2017, 8 pages.

U.S. Appl. No. 15/658,033 , "Notice of Allowance", dated Aug. 30, 2017, 8 pages.

\* cited by examiner

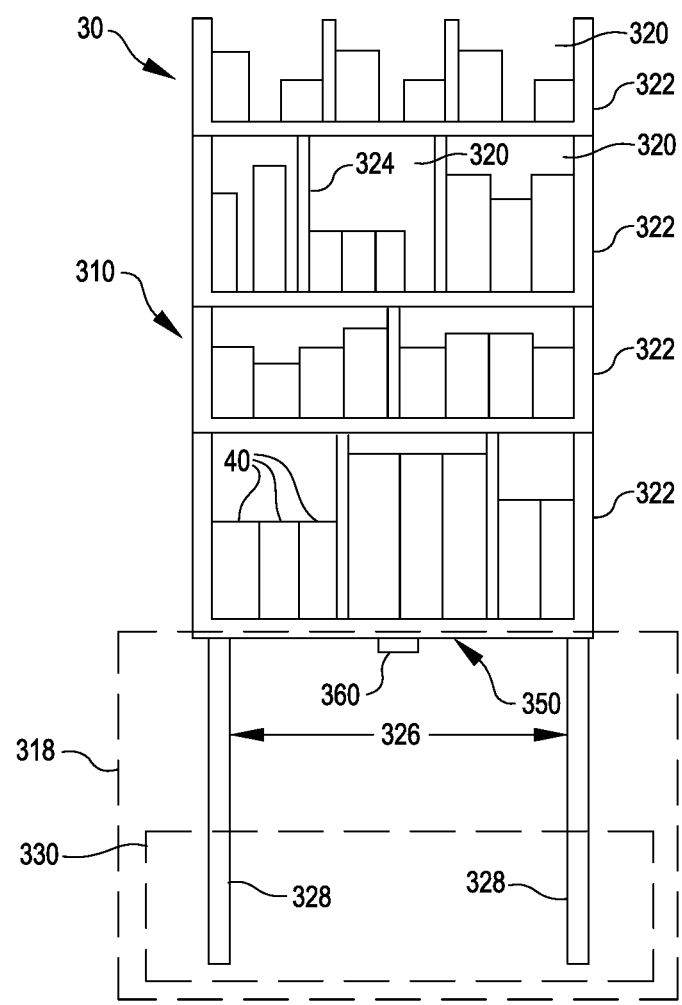

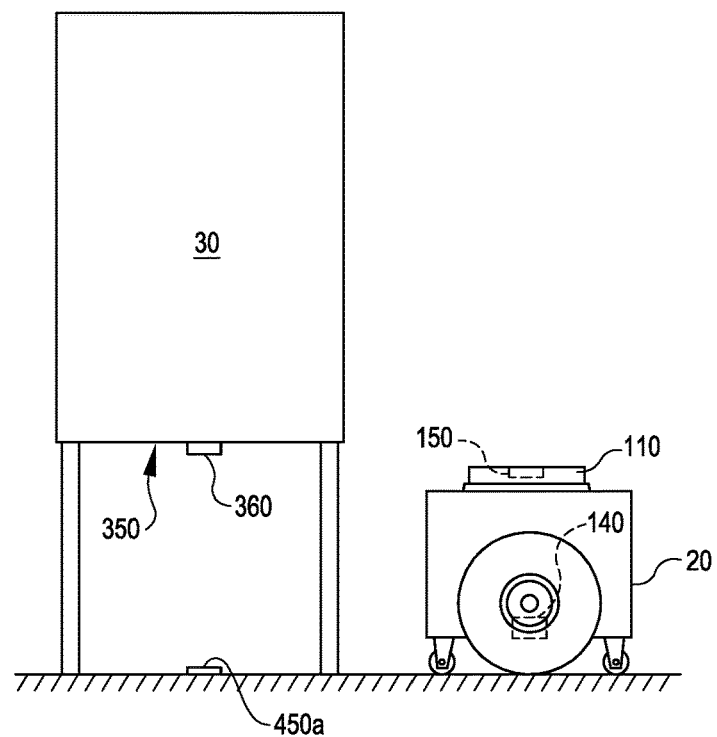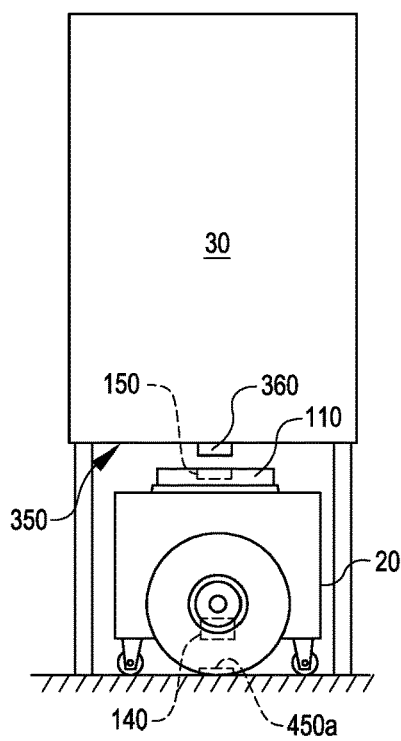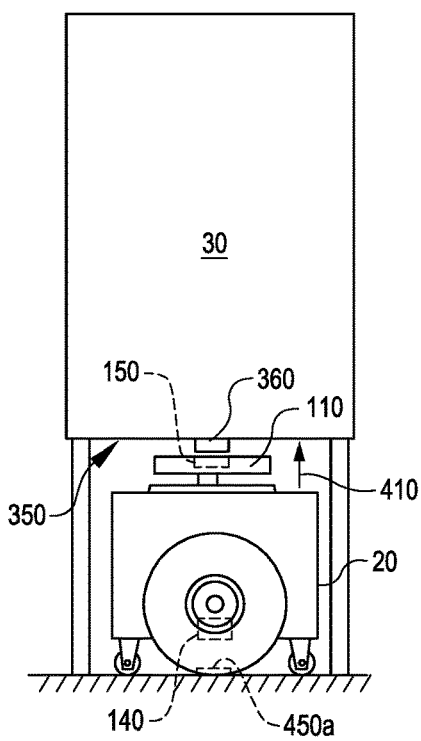

INVENTORY HOLDER LOAD DETECTION AND/OR STABILIZATION

CROSS-REFERENCE TO RELATED APPLICATIONS

This application is a Continuation of U.S. application Ser. No. 15/658,033, filed Jul. 24, 2017, entitled "INVENTORY HOLDER LOAD DETECTION AND/OR STABILIZATION", issued as U.S. Pat. No. 9,856,084 on Jan. 2, 2018, which is a Continuation of U.S. application Ser. No. 15/276,602, filed Sep. 26, 2016, entitled "INVENTORY HOLDER LOAD DETECTION AND/OR STABILIZATION", issued as U.S. Pat. No. 9,738,449 on Aug. 22, 2017, which is a continuation of U.S. application Ser. No. 15/008,378, filed Jan. 27, 2016, entitled "INVENTORY HOLDER LOAD DETECTION AND/OR STABILIZATION", issued as U.S. Pat. No. 9,469,477 on Oct. 18, 2016, which is a continuation of U.S. patent application Ser. No. 14/491,752, filed Sep. 19, 2014 and issued as U.S. Pat. No. 9,280,153 on Mar. 8, 2016, entitled "INVENTORY HOLDER LOAD DETECTION AND/OR STABILIZATION", which are all incorporated herein by reference in their entireties.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. For example, unstable loading when moving inventory items to meet demand may cause inventory items to be dropped, resulting in damage to items, unsafe obstructions to human or robot operators, and/or delays in processes for the dropped items to be cleared. Resulting costs of such dropped items may be prohibitively expensive, limiting the ability of the inventory system to operate efficiently.

BRIEF DESCRIPTION OF THE DRAWINGS

Various embodiments in accordance with the present disclosure will be described with reference to the drawings, in which like reference numerals may represent like parts, and in which:

FIG. 6 illustrates in greater detail an example inventory holder that may be utilized in particular embodiments of the inventory system shown in FIG. 2;

FIG. 7-12 illustrate operation of various components of the mobile drive unit and the inventory holder during docking, movement and undocking according to a particular embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to detecting load characteristics for inventory holders and/or techniques for mitigating negative effects which may arise from uneven or unbalanced load distribution in inventory holders. Load characteristics can include load distribution, weight distribution, and/or a location of a center of mass of the inventory holder.

Figure 1:
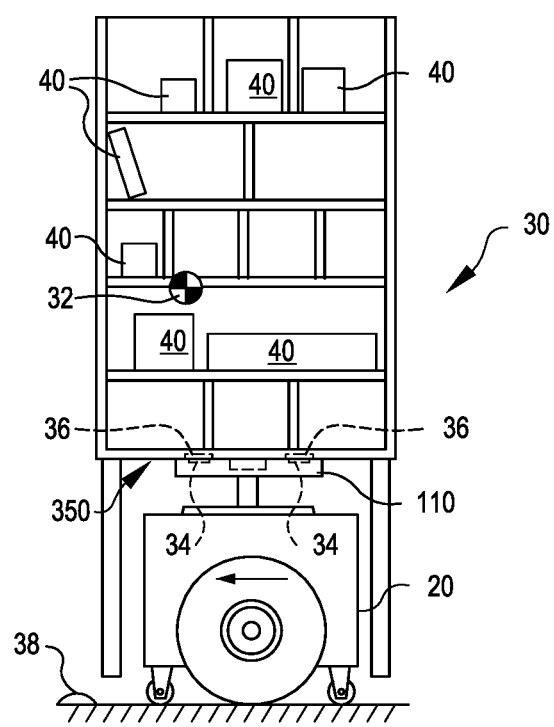
FIG. 1 illustrates an example of a mobile drive unit magnetically coupled with an inventory holder within an inventory system according to a particular embodiment.

In accordance with an embodiment, magnets may be utilized between a mobile drive unit and an inventory holder to improve a strength of connection therebetween and/or to detect a load distribution on the inventory holder, such as for triggering other actions. As an example embodiment, FIG. 1 illustrates an example of a mobile drive unit 20 magnetically coupled with an inventory holder 30. The docking head 110 of the mobile drive unit 20 includes head magnets 34 that align with magnetic surfaces 36 of the docking surface 350 of the inventory holder 30 when the mobile drive unit 20 is docked with the inventory holder 30. The head magnets 34 magnetically couple with the magnetic surfaces 36 to firmly secure the inventory holder 30 relative to the mobile drive unit 20. In this way, magnetically coupling the mobile drive unit 20 with the inventory holder 30 can reduce a risk of the inventory holder 30 tipping over or otherwise negatively shifting alignment while being lifted, carried, and/or moved by the mobile drive unit 20.

Additionally, and/or alternatively, a difference in strengths of magnetic fields acting on the head magnets 34 from magnetic surfaces 036 can indicate a different distribution of weight from the inventory holder 30 on the mobile drive unit 20 at the respective positions of the head magnets 34. Such a difference in weight distribution may be used to provide an indication of the stability of the inventory holder 30 while being lifted, carried, and/or moved by the mobile drive unit 20. For example, a difference in weight distribution may be used to determine a position of a center of mass 32 of the inventory holder 30, which may vary according to the distribution and respective weights of inventory items 40 stored in the inventory holder 30. The weight distribution and/or position of the center of mass 32 may indicate whether the inventory holder 30 is out of balance, such as if a center of mass 32 is not located approximately at the geometrical center of the inventory holder 34. In such unbalanced situations, the magnetic coupling between the head magnets 34 and the magnetic surfaces 036 may alleviate or counteract the imbalance of the inventory holder 30.

Additionally, or alternatively, in response to a determination that the inventory holder 30 is unbalanced, the mobile drive unit 20 may perform other actions. For example, the mobile drive unit 20 may drive over an obstacle 38 in order to impart an impact to inventory items 40 stored in the inventory holder 30 so as to shift a position of the inventory items 40 within the inventory holder 30. Such a shift may adjust the position of the center of mass 32 and improve the balance of the inventory holder 30 relative to the mobile drive unit 20. As another example, the mobile drive unit 20 may undock and redock with the inventory holder 30 to compensate for the imbalance, such as by docking more directly beneath the center of mass 32.

In some aspects, magnetic features such as the head magnets 34 and the magnetic surfaces 36 are only used for one of the securing or load detection functions. In some embodiments, other components are utilized in addition to or in lieu of head magnets 34 and/or magnetic surfaces 36 to determine a load distribution and/or a position of a center of mass 32 of the inventory holder 30. Some such components are discussed in greater detail with respect to FIGS. 13-15 below, following the description of FIGS. 2-12.

Figure 2:
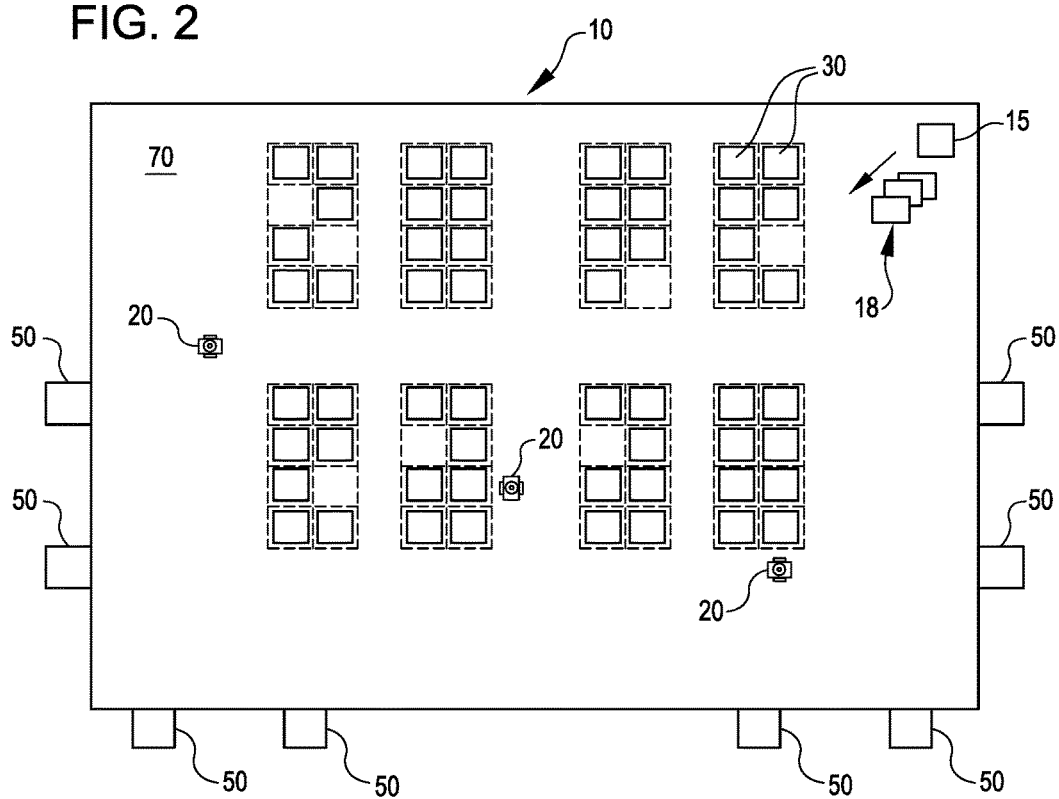
FIG. 2 illustrates components of an inventory system according to a particular embodiment.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. In some embodiments, workspace 70 includes multiple floors, and some combination of ramps, elevators, conveyors, and/or other devices are provided to facilitate movement of mobile drive units 20 and/or other components of the inventory system 10 between the multiple floors. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
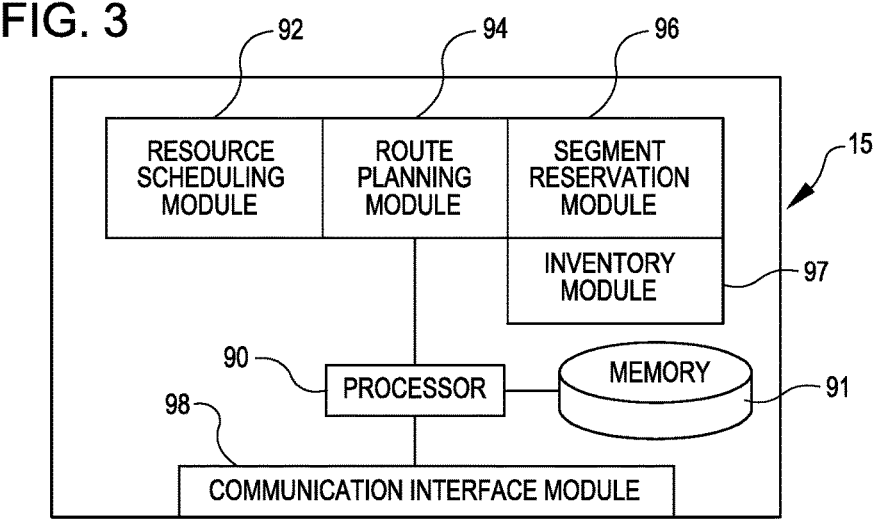
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices, or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish, or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
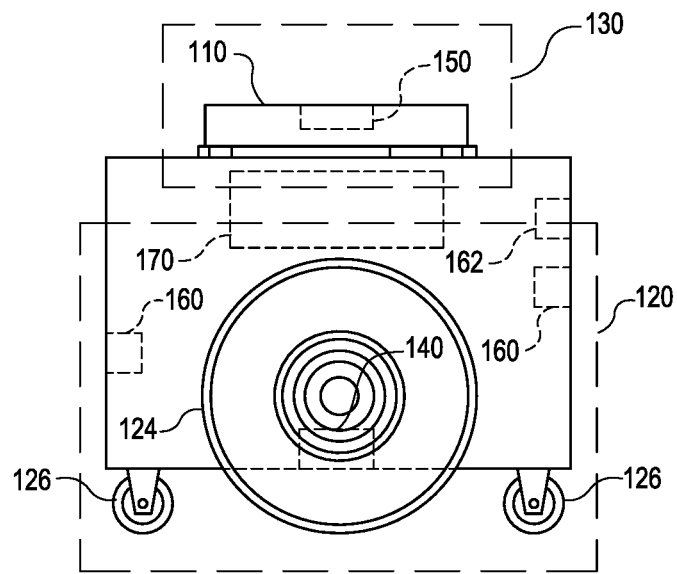
FIGS. 4 and 5 illustrate in greater detail an example mobile drive unit that may be utilized in particular embodiments of the inventory system shown in FIG. 2.
Figure 5:
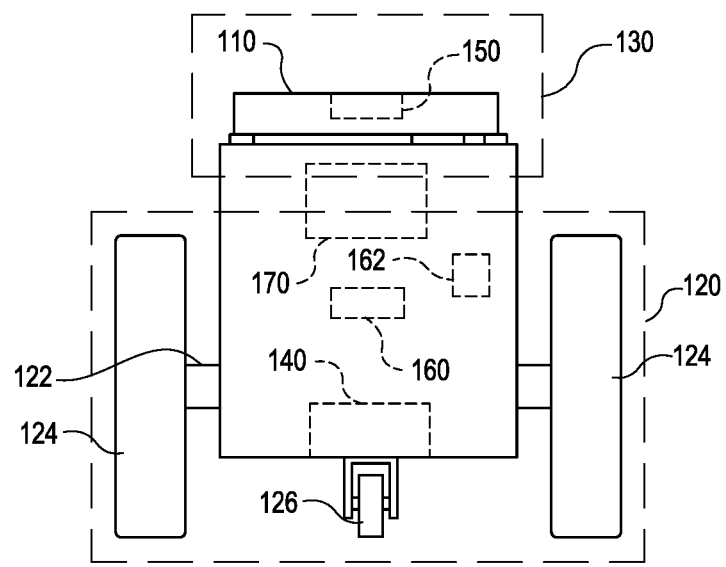

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20.

This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering, and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. In some embodiments, a frame 310 and/or an inventory bin 320 of an inventory holder 30 may be designed to accommodate one or more pallets for inventory items 40. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 7-12 illustrate operation of particular embodiments of mobile drive unit 20 and inventory holder 30 during docking, movement, and undocking.

FIG. 7 illustrates mobile drive unit 20 and inventory holder 30 prior to docking. As noted above with respect to FIG. 1, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 7 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video-processing components, to detect fiducial marks 450.

FIG. 8 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

FIG. 9 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 10:
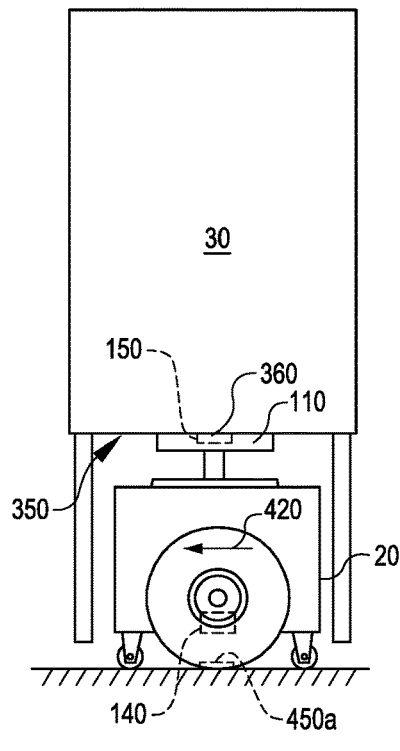

FIG. 10 illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 11:
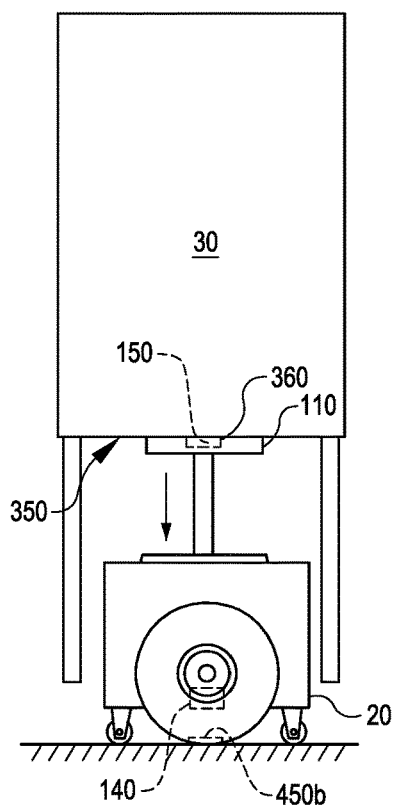

FIG. 11 illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450B, associated with the undocking location. Mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30.

Figure 12:
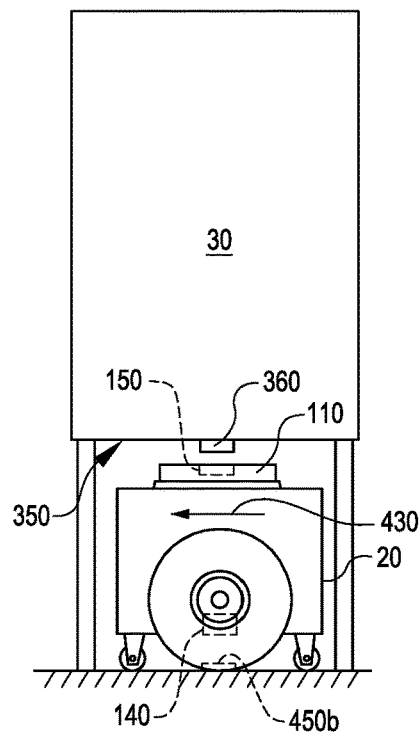

FIG. 12 illustrates a mobile drive unit 20 and inventory holder 30 subsequent to undocking. Mobile drive unit 20 may then move away, as suggested by arrow 430, from inventory holder 30 and begin responding to other commands received by mobile drive unit 20.

As described above, embodiments herein are directed to detecting load characteristics for inventory holders 30 and/or techniques for mitigating negative effects which may arise from uneven or unbalanced load distribution in inventory holders 30.

Figure 13:
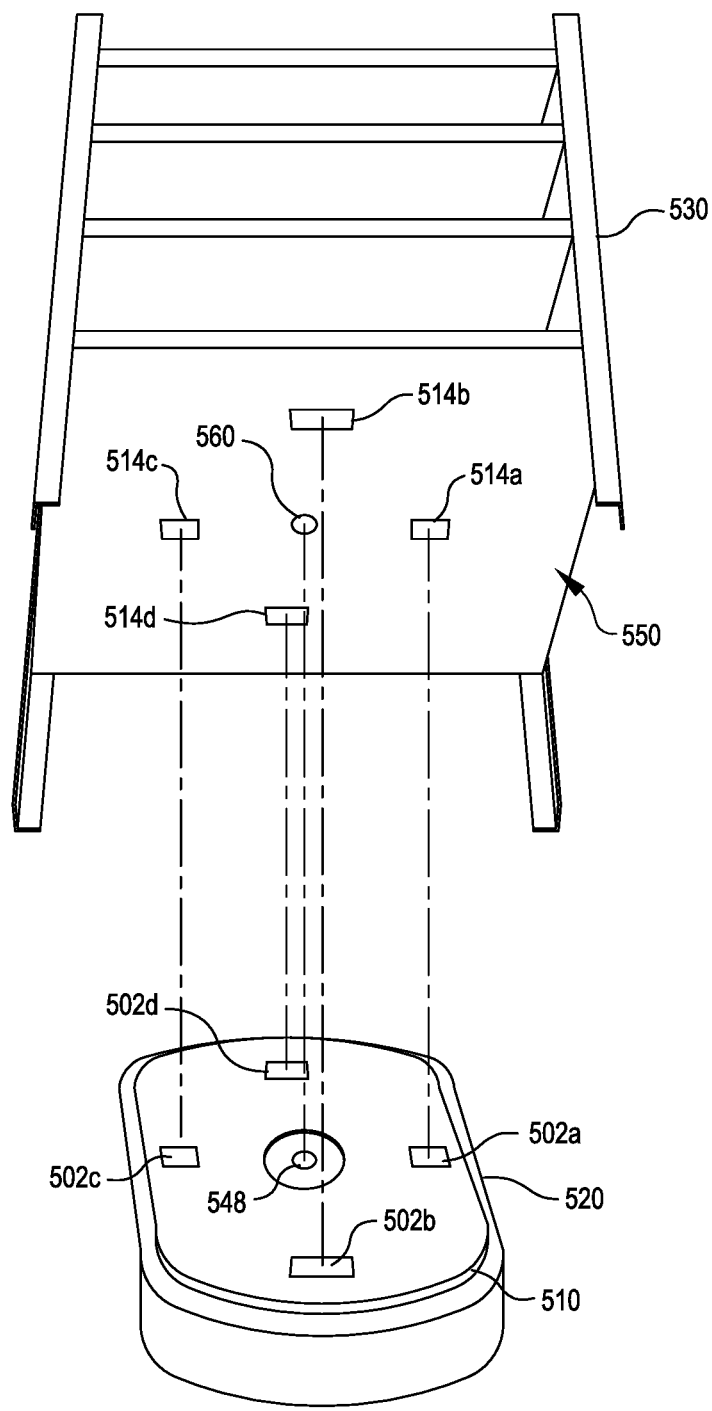
FIG. 13 illustrates an exploded perspective view of an example arrangement of load units of a drive unit and corresponding features of an inventory holder for stabilization or detection of load distribution according to a particular embodiment.

FIG. 13 illustrates an example arrangement of load units 502*a-d* (collectively, load units 502) and corresponding features 514*a-d* (collectively, corresponding features 514) of an inventory holder 530 for stabilization and/or detection of load distribution. The mobile drive unit 520 and the inventory holder 530 can include features or elements of like names described elsewhere herein. For example, the mobile drive unit 520 can include a holder sensor 548 capable of detecting holder identifier 560 to determine a position of the mobile drive unit 520 relative to the inventory holder 530.

The docking head 510 of the mobile drive unit 520 can include any number of load units 502 for determining load distribution of the inventory holder 530. The load units 502 may interact with the docking surface 550 and/or corresponding features 514 in order to detect load distribution. Load units 502 may alternatively or additionally provide a mechanism for securing the docking surface 550 of the inventory holder 530 to the docking head 510 of the mobile drive unit 520, such as to improve a docking connection for heavy or unbalanced loads.

In some embodiments, the load units 502 include magnets, and the corresponding features 514 include ferromagnetic material and/or magnets. In a first example, the load units 502 are permanent magnets that engage with ferromagnetic material or magnets of the corresponding features 514 to magnetically couple the docking head 510 with the docking surface 550. The magnets may be of sufficient strength to magnetically couple with corresponding features 514 of the inventory holder 530, yet of low-enough strength to allow the weight of the mobile drive unit 520 to provide a sufficient opposite force to result in separation of the mobile drive unit 520 from the inventory holder 530 when decoupling is desired. As an illustrative example, a set of magnets for a mobile drive unit 520 weighing 450 pounds may be chosen or calibrated so as to have a maximum net magnetic coupling force of 450 pounds or less. If a coupled inventory holder 530 began to tip over, such an arrangement would allow the magnetic connection to break rather than causing the mobile drive unit 520 to tip over as well.

The corresponding features 514 may be discrete features making up less than the entire docking surface 550, or alternatively, may cover or make up the entire docking surface 550. Magnetically coupling the docking head 510 with the docking surface 550 can improve a stability of the inventory holder 530 when being lifted or moved by the mobile drive unit 520. For example, magnetic coupling between the inventory holder 530 and the mobile drive unit 520 may provide sufficient stability for the mobile drive unit 520 to pick up and move an unbalanced inventory holder 530 having a center of mass that is not located approximately at the geometrical center of the inventory holder 530. Magnetic coupling may also permit the mobile drive unit 520 to transport the inventory holder 530 at greater speeds than would otherwise be possible without magnetic coupling.

In another example, the load units 502 can include electromagnets. The electromagnets may be activated in order to engage magnetic corresponding features 514 of the docking surface 550. Alternatively, the load units 502 can include permanent magnets for docking with the magnetic corresponding features 514 of the docking surface 550 and also include electromagnets for providing a contrary, opposed magnetic field to counteract the permanent magnets for disengaging the docking head 510 from the docking surface 550. Such an arrangement may reduce an energy consumption of the electromagnets as a result of the electromagnets only operating at the time undocking is performed, rather than the entire time that the docking surface 550 and the docking head 510 are engaged. Any suitable combination of permanent magnets, electromagnets, and/or ferromagnetic material can be included in the load units 502 and/or corresponding features 514 to provide desired docking and/or undocking functionality. For example, in one embodiment, a load unit 502a includes a permanent magnet and/or electromagnet and the corresponding feature 514a includes ferromagnetic material, while another embodiment may additionally or alternatively feature a reversed arrangement, in which ferromagnetic material is instead included in a load unit 502b and a permanent magnet and/or electromagnet is instead included in the corresponding feature 514b. As a further example, in some embodiments, an electromagnet included in either a load unit 502c or a corresponding feature 514c may be powered by a power source included in the other of the load unit 502c or the corresponding feature 514c.

In addition to, or as an alternative to, permanent magnets, electromagnets, and/or ferromagnetic material for securing the mobile drive unit 520 to the inventory unit 530, load units 502 may include permanent magnets, electromagnets, and/or ferromagnetic material for detecting a load distribution of weight in the inventory holder 530. An individual magnetic load unit 502 may be configured to detect differences in magnetic fields that correspond to differences in load distribution at the position of the magnetic load unit 502. In one example, magnets of the load unit 502 may be movable, such as a result of being coupled with a calibrated spring that can indicate an amount that the magnet moves. Alternatively, Hall Effect sensors may be used to determine changes in magnetic fields resulting from magnets displacing under load. As another alternative, magnets in the load units 502 may be placed so as to trigger reed switches (e.g., switches that can be tripped by a magnetic field) to indicate that a portion of the docking surface 550 is exerting sufficient pressure on the docking head 510 to displace a magnet to trip the reed switch.

In some embodiments, load units 502 may include a camera or other imaging device for determining a load distribution or center of mass of the inventory holder 530. The camera of a load unit 502 may be, but need not necessarily be, the same camera as used in a holder position sensor 548 (if such an arrangement is used). A load unit 502 may alternatively include an additional camera or imaging sensor beyond that used in the inventory holder position sensor 548. The camera of a load unit 502 may capture a series of images showing the position of a reference item (such as a corresponding feature 514 or marker 560) during a time interval. Changes in the position of the reference item in the images may indicate corresponding changes in the position of the inventory holder 530 relative to the mobile drive unit 520 during the time interval. The changing relative position of the inventory holder 530 may provide a measurement of the stability of the inventory holder 530. For example, the changing relative position of the inventory holder 530 can be compared to acceleration data of the mobile drive unit 520 in the time interval to determine how the inventory holder 530 is responding to the acceleration. In some aspects, the response of the inventory holder 530 to known acceleration may be used to determine a load distribution or center of mass of the inventory holder 530.

In some embodiments, the load units 502 include pressure sensors for determining load distribution of the inventory holder 530. For example, pressure sensors may be distributed across a face of the docking head 510 of the mobile drive unit 520. Non-limiting examples of pressure sensors that may be utilized include calibrated monitored springs, piezoresistive, capacitive, electromagnetic, piezoelectric, optical, potentiometric, resonant, thermal, and ionization-based sensors. Differences in pressure detected by pressure sensors distributed across the docking head 510 may indicate a load distribution of the inventory holder 530 across the docking head 510. For example, a load unit 502*a* registering a greater pressure than a load unit 502*c* may indicate that the center of mass of the inventory holder 530 is biased toward the load unit 502*a*, e.g., the right side of mobile drive unit 520 of FIG. 13. A load unit 502*b* registering a greater pressure than a load unit 502*d* may indicate that the center of mass of the inventory holder 530 is biased toward the load unit 502*b*, e.g., the near side of mobile drive unit 520 of FIG. 13. In this way, a position of the center of mass in an approximately horizontal plane of the docking head 510 may be determined. Differences in pressure detected by load units over time may indicate a response of the mass of the inventory holder 530 to acceleration, which may be utilized to determine a vertical position of the center of mass relative to the height of the inventory holder 530.

In some embodiments, the load units 502 include electrical sensors and the corresponding features 514 include electrical contacts. The electrical sensors may detect differences in electrical connectivity between the mobile drive unit 520 and a docking surface 550 of the inventory holder 530 resulting from differences in load distribution. Electrical sensors of the load units 502 may provide an electrical charge that may be received and/or transmitted by the electrical contacts of the corresponding features 514. Based on the load distribution of the inventory holder 530, the electrical contacts of the corresponding features 514 may displace into or out of contact with the electrical sensors of the load units 502, thereby connecting or breaking circuits so as to provide an indication of the distribution of load or weight among various areas of the docking surface 550. The electrical contacts of the corresponding features 514 that engage the electrical sensors of the load units 502 may be evaluated to determine a distribution of weight and/or a position of a center of mass of the inventory holder 530.

Figure 14:
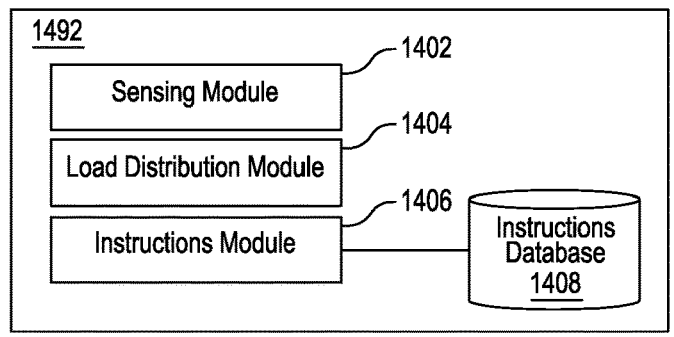
FIG. 14 illustrates components of a resource scheduling module according to a particular embodiment.

FIG. 14 illustrates components of a resource scheduling module 1492 according to a particular embodiment. The resource scheduling module 1492 may provide similar functions as the resource scheduling module 92 described with respect to FIG. 3, and may further provide functionality related to load distribution of inventory holders 530. The resource scheduling module 1492 may include a sensing module 1402, a load distribution module 1404, an instructions module 1406, and an instructions database 1408. The sensing module 1402 can interface with other components of the inventory system 10, such as load units 502 and/or corresponding features 514, to obtain information from sensors about load distribution of inventory holders 530 relative to mobile drive unit 520. The load distribution module 1404 can process information from the sensing module 1402, such as determining the center of mass of inventory holders 530 relative to mobile drive unit 520 based on the acquired sensor information. The instructions module 1406 can access instructions database 1408 and provide instructions to mobile drive units 520, other components, and/or operators of the inventory system 10 based on information from the load distribution module 1404.

Figure 15:
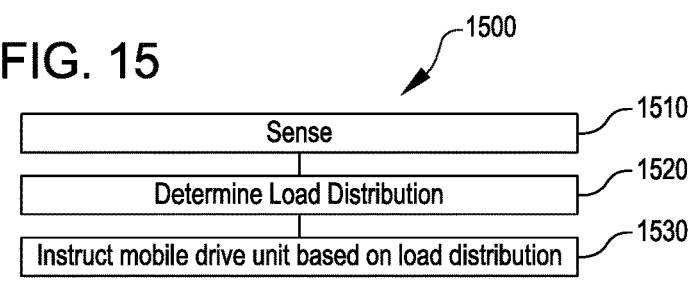
FIG. 15 is a flowchart illustrating an example process that can be performed by the inventory system according to a particular embodiment.

FIG. 15 is a flowchart illustrating an example process 1500 that can be performed by the inventory system 10 according to a particular embodiment. At 1510, the sensing module 1402 can instruct the mobile drive unit 520 to utilize components (such as some combination of the load units 502 and/or corresponding features 514 described with respect to FIG. 13) to obtain information about load distribution of the inventory holder 530 relative to the mobile drive unit 520 and/or receive such information from the mobile drive unit 520. For example, as described above, the sensing module 1402 may obtain information from any combination of magnets, imaging devices, pressure sensors, electrical contacts, or other features associated with load units 502 and/or corresponding features 514.

At 1520, the load distribution module 1404 can determine a center of mass or other load distribution metric for the inventory holder 530. For example, in some embodiments, the load units 502 and/or corresponding features 514 can provide load distribution data that can be utilized to determine a status of an inventory holder 530 and/or alignment relative to a mobile drive unit 520. As one example, the load distribution module 1404 may determine that the load distribution data indicates that the mobile drive unit 520 is engaged with or connected to the inventory holder 530. As another example, the load distribution data may indicate that the inventory holder 530 is unbalanced relative to the mobile drive unit 520. As further example, the load distribution data may indicate that the inventory holder 530 is tipping over (or has tipped over) relative to the mobile drive unit 520.

At 1530, the instructions module 1406 can provide instructions (such as obtained from the instructions database 1408) to the mobile drive unit 520 based on the load distribution of the inventory holder. Although in some embodiments, the instructions may be provided based on a calculated load distribution from a single moment in time, in some embodiments, the instructions may be provided based on a dynamic or ongoing calculation of the load distribution, such as over an extended period of time.

A variety of different responses may be instructed based on a detected load distribution of an inventory holder 530 and/or a determination that the inventory holder 530 is unbalanced. In some embodiments, the instructions module 1406 may instruct a change in destination of an inventory holder 530 based on the load distribution. For example, the instructions module 1406 may send instructions to the mobile drive unit 520 to move the inventory holder 530 to a station 50 at which a particular item(s) that is causing an imbalance in the inventory holder 530 can be removed or adjusted, either automatically, semi-automatically, or manually.

In some embodiments, the instructions module 1406 may instruct the mobile drive unit 520 to alter a manner of docking with the inventory holder 530. As one non-limiting example, the mobile drive unit 520 may be instructed to disengage the docking head 510 from the docking surface 550 and to re-engage the inventory holder 530 at a position closer to directly beneath the center of mass of the inventory holder 530. As another non-limiting example, the mobile drive unit 520 may be instructed to use magnets to more securely engage the inventory holder 530. As a further non-limiting example, the mobile drive unit 520 may be instructed retain the inventory holder 530 in a lifted state until an unbalanced status is resolved. Such an arrangement may permit an operator to reach the inventory holder 530 and resolve the unbalanced status and/or may permit the mobile drive unit 520 to utilize magnets or other connection-improving mechanisms to secure and move the inventory holder 530 until the unbalanced status is resolved by addition and/or removal of inventory items 40 during the normal operation of the inventory system 10.

In some embodiments, the instructions module 1406 may instruct the mobile drive unit 520 to change a velocity of travel while transporting the inventory holder 530 based on the mass distribution of the inventory holder 530. As non-limiting examples, the mobile drive unit 520 may be instructed to increase speed when the inventory holder 530 is well-balanced and is unlikely to tip over at higher speeds, and/or to decrease speed when the inventory holder is less balanced and more prone to tipping over at higher speeds.

In some embodiments, the load distribution module 1404 may receive information about the load distribution on the inventory holder 530 and compare that data to data about the inventory items 40 that are stored in the inventory holder 530. For example, the total weight of an inventory holder 530 (including the weight of the inventory items 40 stored therein) that is measured by the load units 502 can be compared with stored information about the particular contents of the inventory holder 530 to determine if weight estimates stored for the particular contents are accurate.

In some embodiments, the mobile drive unit 520 may also release any magnetic coupling with the inventory holder 530 in response to a determination that the inventory holder 530 is tipping over relative to the mobile drive unit 520. This may be a useful action to prevent the mobile drive unit 520 from also tipping over along with the inventory holder 530.

In some embodiments, the instructions module 1406 may instruct the mobile drive unit 520 to move in an abrupt manner that is likely to adjust and/or improve a load distribution of the inventory holder 530. For example, the mobile drive unit 520 may be instructed to turn suddenly, accelerate, decelerate, set down or drop the inventory holder 530 abruptly, spin, and/or perform other motions likely to shift the position of target inventory items 40 stored on the inventory holder 530.

In some embodiments, the mobile drive unit 520 can be instructed to interact with or engage, or cause the inventory holder 530 to interact with or engage, an obstacle. Non-limiting examples of obstacles include a bump (such as shown in FIG. 1), a bar positioned above a floor at a height close to a shelf on which the inventory item is positioned, a wall, another mobile drive unit 520, and another inventory holder 530. As an illustrative example, in some aspects, an inventory holder 530 may be collided with another inventory holder 530 in order to transfer inventory items 40 or adjust and/or secure inventory items 40 in one or the other of the inventory holders 530 that are collided together.

In some embodiments, the mobile drive unit 520 may be instructed to take the inventory holder 530 to a location for subsequent actions. For example, the mobile drive unit 520 may take the inventory holder 530 to a station where an operator may improve a load distribution or balance of the inventory holder 530 by adjusting the distribution of inventory items 40 stored in the inventory holder 530. As another example, an inventory holder 530 may be carried by a mobile drive unit 520 to a vibration plate or other mechanism configured to jostle the inventory holder 530, with or without the mobile drive unit 520, and without using the mobile drive unit 520 to impart the jostling motion to the inventory holder 530. In some embodiments, the station, a mobile drive unit, an inventory holder, and/or other components particularly configured to accommodate collisions, jostling, or vibrating inventory items 40 relative to the inventory holder 530 can include padding or netting arranged to receive inventory items 40 falling and/or moving as a result of the collisions, jostling, or vibrating. In some embodiments, collisions, jostling, or vibrating may be performed in order to preemptively cause any loose or unbalanced inventory items 40 to become displaced from the inventory holder 530. Such preemptive action may cause displacement of inventory items 40 at a location where the displacement is easily handled (such as at a station 50, where an operator can recover and/or rearrange the problematic inventory items 40), rather than at a more problematic location (such as remote from a station 50, where a displacement may interfere with normal operation of an inventory system 10 and be difficult for an operator to reach).

In some embodiments, based on inventory data about inventory items 40 stored in an inventory holder 530, the management module 15 may analyze a risk of performing such collisions, jostling, or vibrating. For example, the management module 15 may determine a risk of damage based on whether the inventory items 40 are fragile, contain liquid or are otherwise at high risk. The management module 15 may determine that the risk of damaged inventory items 40 outweighs the benefit of rebalancing inventory items 40 on an inventory holder 530 and instruct the mobile drive unit 520 not to perform such an action based on that determination.

Figure 16:
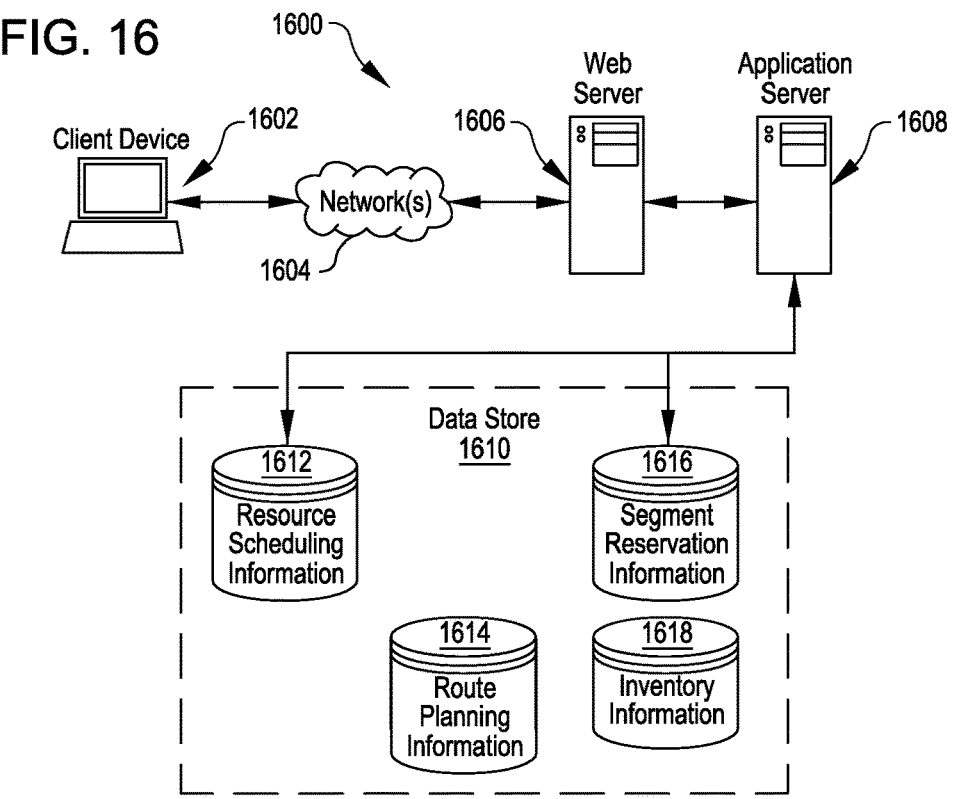
FIG. 16 illustrates aspects of an example environment for implementing aspects in accordance with various embodiments.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, and/or inventory information 1618. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets)

or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   receiving, from a sensor, information about a load distribution of an inventory holder relative to a mobile drive unit, the load distribution dependent on a distribution of any inventory items stored in the inventory holder; and
   receiving or generating instructions that are based at least in part on the information received from the sensor and that instruct operation of a drive module of the mobile drive unit to cause the mobile drive unit to perform motion so as to cause a shift of position of at least one inventory item relative to the inventory holder to change the load distribution of the inventory holder relative to the mobile drive unit.

2. The method of claim 1, further comprising instructing operation of the drive module to at least one of accelerate or decelerate to cause the shift of position of the at least one inventory item relative to the inventory holder.

3. The method of claim 1, further comprising instructing operation of the drive module to turn while driving to cause the shift of position of the at least one inventory item relative to the inventory holder.

4. The method of claim 1, further comprising instructing operation of the drive module to spin to cause the shift of position of the at least one inventory item relative to the inventory holder.

5. A management module configured for inclusion in or communication with a mobile drive unit, the management module comprising a non-transitory computer-readable storage medium having stored therein instructions that, when executed by one or more processors of a computer system, cause the computer system to at least:
   receive or generate instructions that instruct motion of the mobile drive unit for facilitating a shift of position of at least one inventory item from one position in an inventory holder docked with the mobile drive unit for movement by the mobile drive unit to another position within or out of the inventory holder.

6. The management module of claim 5, wherein the management module is further configured to instruct the mobile drive unit to perform motion including moving motion or stopping motion.

7. The management module of claim 5, wherein the management module is further configured to instruct the mobile drive unit to move by at least one of accelerating, decelerating, turning while driving, spinning, or dropping the inventory holder.

8. The management module of claim 5, wherein the management module is further configured to instruct movement of the mobile drive unit to cause at least one of the mobile drive unit or the inventory holder to at least one of interact with or engage an obstacle.

9. The management module of claim 5, wherein the management module is further configured to instruct movement of the mobile drive unit to cause at least one of the mobile drive unit or the inventory holder to at least one of interact with or engage an obstacle comprising at least one of a bump over which the mobile drive unit drives, a bar positioned above a floor on which the mobile drive unit drives, a wall, another mobile drive unit, or another inventory holder.

10. The management module of claim 5, wherein the management module is further configured to cause at least one inventory item to move from one position within the inventory holder to another position within the inventory holder as a result of the shift of position.

11. The management module of claim 5, wherein the management module is further configured to cause at least one inventory item to move from one position within the inventory holder to another position out of the inventory holder as a result of the shift of position.

12. The management module of claim 5, wherein the management module is further configured to cause at least one inventory item to move from one position within the inventory holder to a location on another inventory holder as a result of the shift of position.

13. The management module of claim 5, wherein the management module is further configured to:
receive or generate the instructions based at least in part on the information obtained by a sensor; and
receive information about a load distribution of the inventory holder relative to the mobile drive unit, the load distribution dependent on a distribution of any inventory items stored in the inventory holder.

14. The management module of claim 5, wherein the management module is further configured to receive or generate the instructions based at least in part on an analysis of a risk of damage from performing actions for facilitating the shift of position.

15. The management module of claim 5, wherein the management module is further configured to instruct movement of the mobile drive unit for facilitating the shift of position of the at least one inventory item relative to the inventory holder and relative to at least one of padding or netting arranged to receive the at least one inventory items moving as a result of shift, the at least one of padding or netting arranged on at least one of the inventory holder, the mobile drive unit, or a component at a station configured to receive the mobile drive unit and inventory holder.

16. A module configured for inclusion in or communication with a mobile drive unit, the module comprising a non-transitory computer-readable storage medium having stored therein instructions that, when executed by one or more processors of a computer system, cause the computer system to at least:
receive or generate instructions that are based at least in part on information obtained by a sensor about a load distribution of an inventory holder relative to the mobile drive unit and that instruct the mobile drive unit to impart motion to move the inventory holder to a station of a workspace for performance of actions for facilitating a shift of position of at least one inventory item relative to the inventory holder.

17. The module of claim 16, wherein the module is further configured to instruct the mobile drive unit to move the inventory holder to a position at the station for engagement with a vibration plate or other mechanism configured to impart a jostling motion to the inventory holder without using the mobile drive unit to impart the jostling motion so as to cause the shift of position of the at least one inventory item relative to the inventory holder.

18. The module of claim 16, wherein the module is further configured to instruct the mobile drive unit to move the inventory holder to a position at the station arranged to facilitate performance of actions by an operator to cause the shift of position of the at least one inventory item relative to the inventory holder.

19. The module of claim 16, wherein the module is further configured to instruct the mobile drive unit to move the inventory holder abruptly en route to or from the station for facilitating the shift of position of the at least one inventory item relative to the inventory holder.

20. The module of claim 19, wherein the module is further configured to instruct the mobile drive unit to move the inventory holder abruptly by at least one of accelerating, decelerating, turning while driving, spinning, dropping the inventory holder, or by causing at least one of the mobile drive unit or the inventory holder to at least one of interact with or engage an obstacle.

* * * * *